K. W. THALHAMMER.
ELECTROMAGNETIC CONTROLLING DEVICE FOR CAMERA SHUTTERS.
APPLICATION FILED JUNE 6, 1916.
1,247,902.
Patented Nov. 27, 1917.
2 SHEETS—SHEET 1.
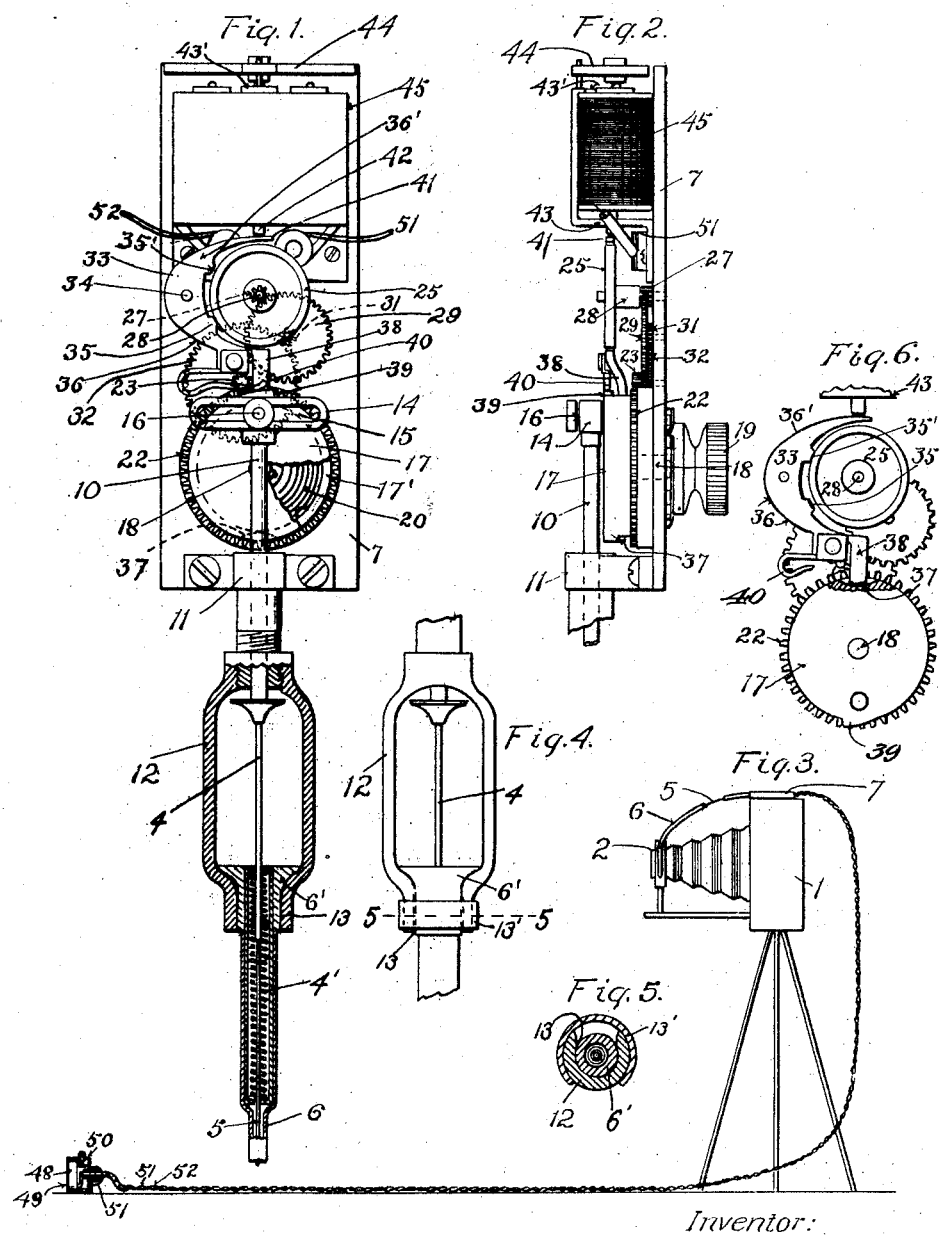
Inventor:
Karl W. Thalhammer.
by Arthur P. Knight
his atty K. W. THALHAMMER.
ELECTROMAGNETIC CONTROLLING DEVICE FOR CAMERA SHUTTERS.
APPLICATION FILED JUNE 6, 1916.
1,247,902.
Patented Nov. 27, 1917.
2 SHEETS—SHEET 2.
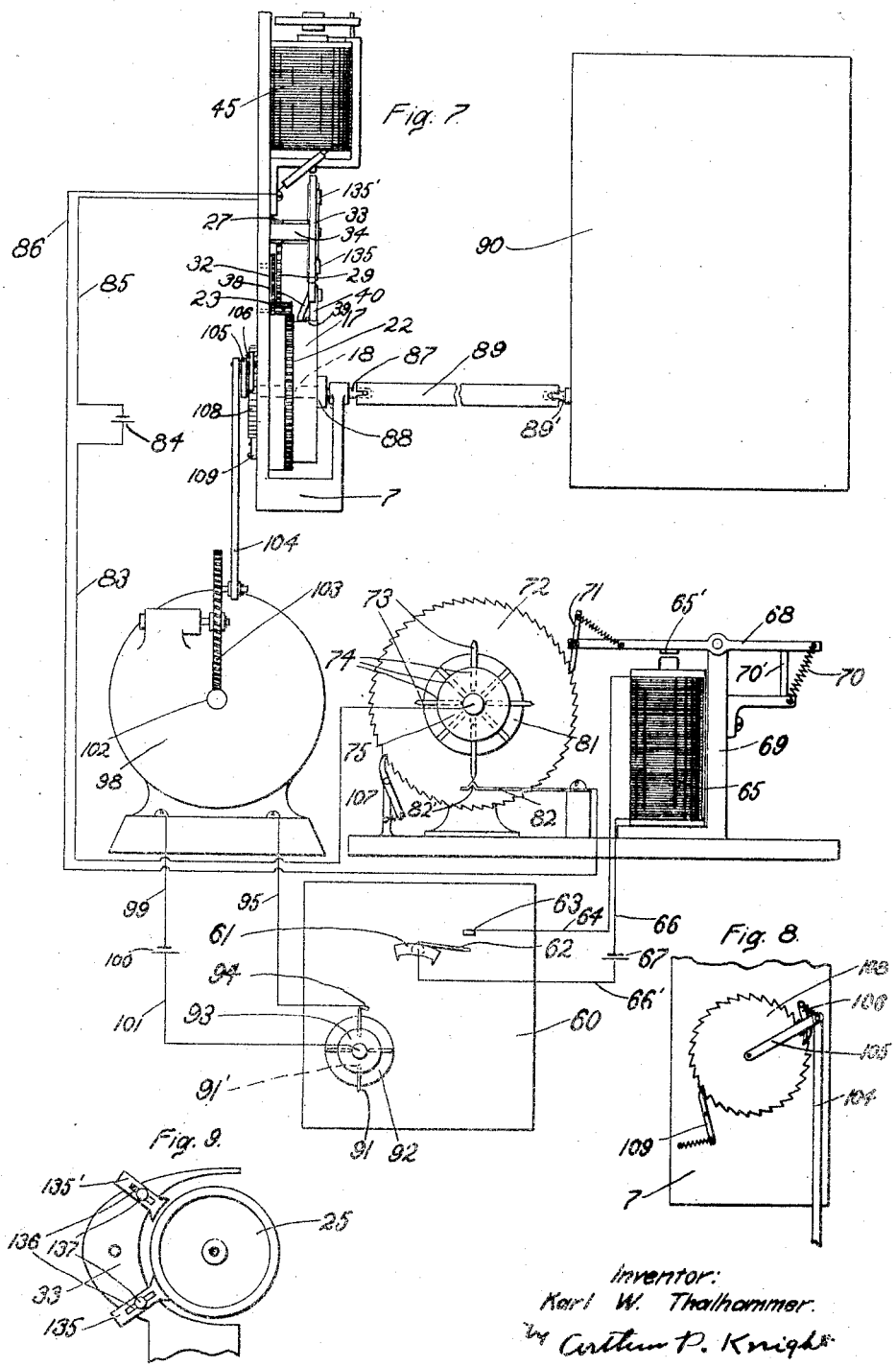
Inventor:
Karl W. Thalhammer.
by Arthur P. Knight
his Atty

UNITED STATES PATENT OFFICE.

KARL W. THALHAMMER, OF LOS ANGELES, CALIFORNIA.

ELECTROMAGNETIC CONTROLLING DEVICE FOR CAMERA-SHUTTERS.

1,247,902.  Specification of Letters Patent. Patented Nov. 27, 1917.

Application filed June 6, 1916. Serial No. 101,896.

*To all whom it may concern:*

Be it known that I, KARL W. THALHAMMER, a subject of the Emperor of Austria, residing at Los Angeles, in the county of Los Angeles and State of California, have invented a new and useful Electromagnetic Controlling Device for Camera-Shutters, of which the following is a specification.

The main object of the present invention is to provide for operation of a camera shutter by a person at a considerable distance from the camera, so as to enable such person to be present in the picture which is being taken, or to enable pictures to be taken of subjects, such as wild animal life, where the presence of a person near the camera would be undesirable.

A further object of the invention is to provide for operation of the camera shutter for time, bulb, or instantaneous exposure, as may be desired.

A further object of the invention is to provide for automatic operation of a moving-picture camera at regular intervals without requiring the attention of an operator.

The accompanying drawings illustrate my invention, and referring thereto:

Figure 1 is a front elevation of the electromagnetic controlling means, with the inclosing case removed.

Fig. 2 is a side elevation thereof.

Fig. 3 is an elevation of the camera, the controlling device, and the circuit therefor.

Fig. 4 is a side elevation of the coupling for connecting the controlling device to the shutter operating member.

Fig. 5 is a section on line 5—5 in Fig. 4.

Fig. 6 is a front elevation of the controlling device, with parts broken away, the device being shown in position for "bulb" operation.

Fig. 7 is a side elevation of the controlling means and apparatus adapted for use with a moving-picture camera.

Fig. 8 is a rear elevation of the controlling means, showing means for winding up the operating mechanism when used with a moving-picture camera.

Fig. 9 is a front elevation of the brake means for the form shown in Figs. 7 and 8.

In Figs. 1 to 6, my invention is shown as adapted to be used in connection with that type of camera shutter operating means which comprises a flexible wire or member operated by a push button to move the shutter tripping lever. In Fig. 3, the camera 1 is shown provided with a shutter 2, which is operated by a flexible wire 5 extending within a flexible casing 6 and connected at its outer end to the operating means hereinafter described. Said operating means is mounted on a frame or casing 7 to which the frame or casing 6 is connected, said frame plate being adapted to be mounted, hung or placed in any suitable position, for example, placed on top of the camera, as shown in Fig. 3.

The means for operating the shutter tripping or operating wire comprises a plunger 10 mounted to slide in a bearing 11 on frame plate 7. To facilitate connection of the operating cord to the operating means, a coupling may be provided comprising a case 12 adapted to screw on to the bearing 11, and having at its opposite end a bore for receiving a head 6' on the end of the cord casing 6, which is thereby connected to the frame member 7. The coupling member 12 may be provided with a slot 13 for receiving the head 6', and a slit ring 13' may be mounted on the case 12 to retain the head 6' in position.

The plunger 10 is provided with a cross head 14, slotted as at 15 to engage a pin 16 on an operating wheel 17. Said wheel 17 is rotatably mounted on a shaft 18 which is mounted to turn on the frame 7 and carries an operating handle or knurled thumb piece 19 whereby it may be turned. A coiled spring 20 is connected at one end to shaft 18 and at its other end to wheel 17 so that when said spring is wound up by turning said shaft it will tend to rotate said wheel, such rotation of said wheel being controlled by electromagnetically operated detent means, as hereinafter set forth. Wheel 17 is preferably formed with a flange portion 17' inclosing the spring 20 and forming a case therefor, and said flange is provided with a spur gear 22 engaging a pinion 23 rotatably mounted on the frame 7. The gear members 22 and 23 form part of a train of gears connecting the wheel 17 with a brake or detent wheel 25, said train having any desired number of members, according to the amount of speed reduction desired between the detent wheel 25 and the main operating wheel 17, the function of this train of gears being to provide for a relatively high speed of the detent wheel, and a relatively low speed of the wheel 17. In the drawings I have shown a pinion 27 on the shaft 28 of the detent wheel engaging a gear wheel 29 connected to a pinion 31 which engages a gear wheel 32 connected to pinion 23 aforesaid.

A brake or detent lever 33 is pivotally mounted at 34 on frame 7 and spans or embraces the brake wheel or detent wheel 25 so that brake shoes or projections 35 and 35' on the respective arms 36 and 36' of said lever, at opposite sides of its pivot, will engage alternatively with the periphery of wheel 25, according to whether the lever 33 is swung in one direction or the other around its pivot. Such swinging of the lever is controlled in part by the wheel 17, said wheel having a notch or recess 37 adapted to engage a projection 38 on arm 36 of lever 33, and said wheel 17 also having a lug or projection 39 adapted to engage a leaf spring 40 on said arm 36, so that the extent to which the lever may be turned or swung by its operating means is determined by the position of the wheel 17.

Arm 36' of lever 33 has an extension 41 adapted to be engaged by a pin or rod 42 slidably mounted in bearing 43 on the frame 7, said pin or rod carrying an armature 44 for an electromagnet 45.

Electromagnet 45 is connected in a circuit comprising a battery 48 and a push button 50, a wire 51 leading from said push button to electromagnet 45, and a wire 52 connecting said electromagnet to the other side of the battery 48. Push button 50 and battery 48 are preferably mounted in a small portable case 49, said battery being connected directly to one side of said push button.

The operation of this form of the invention is as follows:

To set the device for operation, the flexible casing 6 for the flexible operating means 5 for the camera shutter 2, which is connected to the shutter case in the usual manner, is connected by the coupling 12 to the frame 7 so that the usual head 4 on the flexible wire or member 5 is in position to be engaged by the plunger 10, being held in that position by the usual spring 4'. The frame 7 is placed in any suitable position, for example, on top of the camera as shown, and the circuit wires 51, 52, which may be twisted into a cable, as shown, are placed so as to bring the push button 50 at any suitable point where the operator is to be stationed, this point being for example at a distance from the camera, so as to enable the operator to be in the picture or to be concealed from animals which are to be photographed. The controlling device is set for action by winding up its spring 20 by turning the handle means 19, the shaft 18 being held from backward movement by suitable ratchet means. Normally the plunger 10 stands in the position shown in Fig. 1, and in the normal position of the wheel 17 the lug 39 thereon engages the spring 40 on arm 36 of detent lever 33, so as to press the brake or detent shoe 35 on said arm against the wheel 25 and thereby arrest the said wheel and through the train of gears 27, 29, etc., to arrest the motion of wheel 17 under the action of spring 20. The camera adjustments having been made the operator retires to the location of the push button and at the proper moment for exposure, presses the push button 50 which closes the circuit from battery 48 through said push button, thence by wire 51 to electromagnet 45, thence by wire 52 to the other side of the battery 48. The electromagnet being then energized, attracts its armature 44 and causes the pin 42 to engage the extension 41 on arm 36' so as to swing said arm toward the wheel 25 and to swing the arm 36 away from said wheel. This removes the brake shoe 35 from the periphery of wheel 25 but the projection 38 of arm 36 strikes and rides on the periphery of the annular flange 17' of wheel 17, thereby limiting the swing of the lever 33, and preventing the arm 36' from being swung far enough to bring the shoe 35' thereon in contact with the wheel 25. The wheel 25 will therefore be set in rotation by the action of the spring 20 acting through the train of gears 22, 23, etc., and the wheel 17 will also revolve, causing the pin 16 thereon to move the plunger 10 so as to force the flexible member or wire 5 along its casing 6 and to thereby operate the camera shutter. Said shutter is provided with the usual adjustments for "time", "bulb", and "instantaneous" exposures, and if it has been set for "instantaneous" exposure, this operation of the member 5 will cause the shutter to open and close in the usual manner. If the shutter has been set for "bulb" exposure, the operator will hold the push button 50 closed, thereby maintaining the pressure of the pin 42 against the arm 36' by the action of the electromagnet and when the wheel 17 has made half a revolution, the recess 37 therein comes under the projection 38 on arm 36, and allows said arm to move sufficiently farther to bring the shoe 35' on arm 36' into engagement with wheel 25, arresting the movement of the train of wheels and holding plunger 10 in operated position. As long as the push button is held closed the plunger will be retained in this position, and the shutter, being set for "bulb" exposure, will remain open until the push button is released, when the electromagnet 45 will be deënergized and lever 33 will be moved by spring 40 so as to remove shoe 35' from wheel 25, permitting the wheel 25 and the train of gears to turn, so as to restore the plunger 10 to normal position and to close the shutter, the motion of the wheel 25 being finally arrested when the lug or projection 39 engages the spring 40 and moves the lever 33 sufficiently farther to bring the shoe 35 in contact with wheel 25. If the shutter is set for "time" exposure, the operator will press and immediately release the push button 50, and the momentary energization of electromagnet 45 will release the shoe 35 from wheel 25 for a sufficient time to permit the lug 39 on wheel 17 to pass from beneath spring 40, so that lever 33 assumes its intermediate position, with both of its shoes free of wheel 25, and as the wheel 17 rotates the passage of the recess 37 therein beneath the projection 38 on arm 36 is without effect, as there is no pressure from the armature of the electromagnet to force the said projection into the said recess. The wheel 17 will therefore, under these conditions, continue to rotate, until its revolution is completed, and the lug 39 on said wheel engages spring 40 and moves the lever to normal position, bringing shoe 35 in position to arrest the motion of wheel 25.

It will be noted that in every case, the manipulation of the push button by the operator corresponds to the usual manipulation of the shutter operating device, so that no special skill or practice is required to properly operate the device.

An important feature of the controlling means above described is that the operating means is controlled by a braking action, giving a smooth or jarless starting and stopping action, which is very desirable in camera work, as it contributes to giving a clear picture.

What I claim is:

1. A controlling device for camera shutters, comprising an operating spring, mechanism operated by said spring to control the shutter, detent means for normally holding said mechanism in a fixed position, electromagnetically controlled means for releasing said mechanism from said detent means and permitting operation of said mechanism by said operating spring, said electromagnetically controlled means being adapted when operated, to arrest the motion of said mechanism when it has reached a second fixed position, and said electromagnetically controlled means being adapted, in its return movement to normal position, to permit further movement of said mechanism.

2. A controlling means for camera shutters, comprising an operating spring, mechanism operated by said spring to control the shutter, a controlling electromagnet, an operating circuit therefor including a source of current and a circuit closer, detent means normally holding said mechanism from movement, means operated by said magnet for moving said detent means to position for releasing it from said mechanism to permit operation of said mechanism by said spring, said mechanism being provided with means for controlling the movement of said detent means, and for permitting a further movement of said detent means when the mechanism is in a certain operated position, and said detent means being adapted to stop the said mechanism when moved to such farther position, and to again release the mechanism when the electromagnet is deënergized.

3. A controlling means for camera shutters, comprising an operating spring, means for winding the same, and mechanism operated by said spring to control the shutter, and comprising a wheel connected to said spring, a plunger operated by said wheel, means adapted for operation by said plunger for operating the camera shutter, a train of gearing connected to said wheel, a detent wheel operated by said train of gearing, a detent lever having arms provided with detent brake means adapted to engage the wheel to stop the same in normal position and in extreme operated position of said lever, and to release said wheel in an intermediate position of said lever, an electromagnet and means operated thereby for operating said lever, said plunger operating wheel being provided with means for engaging the detent lever to normally prevent its operation beyond said intermediate position, and with means for permitting movement of said lever to extreme operated position when said wheel is in a certain position.

In testimony whereof I have hereunto set my hand, at Los Angeles, California, this 31st day of May 1916.

KARL W. THALHAMMER.

Copies of this patent may be obtained for five cents each, by addressing the "Commissioner of Patents, Washington, D. C."